United States Patent
Lee et al.

(10) Patent No.: US 12,241,161 B2
(45) Date of Patent: *Mar. 4, 2025

(54) ALUMINUM-ZINC ALLOY PLATED STEEL SHEET HAVING EXCELLENT HOT WORKABILITY AND CORROSION RESISTANCE, AND METHOD FOR MANUFACTURING SAME

(71) Applicant: POSCO CO., LTD, Pohang-si (KR)

(72) Inventors: Suk-Kyu Lee, Gwangyang-si (KR); Il-Jeong Park, Gwangyang-si (KR); Myung-Soo Kim, Gwangyang-si (KR)

(73) Assignee: POSCO CO., LTD, Gyeongsangbuk-Do Pohang-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/271,345

(22) PCT Filed: Aug. 23, 2019

(86) PCT No.: PCT/KR2019/010795
§ 371 (c)(1),
(2) Date: Feb. 25, 2021

(87) PCT Pub. No.: WO2020/045905
PCT Pub. Date: Mar. 5, 2020

(65) Prior Publication Data
US 2021/0348257 A1 Nov. 11, 2021

(30) Foreign Application Priority Data
Aug. 30, 2018 (KR) .................. 10-2018-0102602

(51) Int. Cl.
*B32B 15/01* (2006.01)
*C22C 21/10* (2006.01)
(Continued)

(52) U.S. Cl.
CPC .............. *C23C 2/12* (2013.01); *B32B 15/012* (2013.01); *C22C 21/10* (2013.01); *C22C 38/02* (2013.01);
(Continued)

(58) Field of Classification Search
None
See application file for complete search history.

(56) References Cited

U.S. PATENT DOCUMENTS 4,456,663 A * 6/1984 Leonard .................... C23C 2/12
428/653
6,610,422 B1 8/2003 Ooi et al.
(Continued)

FOREIGN PATENT DOCUMENTS

CN 1392284 1/2003
CN 1455824 11/2003
(Continued)

OTHER PUBLICATIONS

International Search Report—PCT/KR2019/010795 dated Dec. 6, 2019.
(Continued)

*Primary Examiner* — Kim S. Horger
(74) *Attorney, Agent, or Firm* — Morgan, Lewis & Bockius LLP

(57) ABSTRACT

Provided are an aluminum-zinc alloy plated steel sheet having excellent hot workability and corrosion resistance, and a method for manufacturing same. The plated steel sheet has an Al—Zn hot-dip aluminized coating layer on a base steel sheet, wherein: the coating layer is composed of a lower layer part and an upper layer part; the lower layer part comprises 40-50% of Fe, 50-60% of Al, 1% or less of Si, and other unavoidable impurities, on the basis of wt % of the lower layer part itself; the upper layer part comprises (Continued)

(a)

(b)

10-30% of Zn, the balance of Al, and 0.05% or less of at least one of Cr, Mo, and Ni as an impurity, on the basis of wt % of the upper layer part itself; and the thickness of the upper layer part accounts for 30% or less of the total thickness of the coating layer.

6 Claims, 3 Drawing Sheets

(51) Int. Cl.
*C22C 38/02* (2006.01)
*C22C 38/04* (2006.01)
*C22C 38/06* (2006.01)
*C23C 2/02* (2006.01)
*C23C 2/12* (2006.01)
*C23C 2/20* (2006.01)
*C23C 2/28* (2006.01)
*C23C 2/40* (2006.01)

(52) U.S. Cl.
CPC .............. *C22C 38/04* (2013.01); *C22C 38/06* (2013.01); *C23C 2/02* (2013.01); *C23C 2/20* (2013.01); *C23C 2/28* (2013.01); *C23C 2/40* (2013.01)

(56) References Cited

U.S. PATENT DOCUMENTS

| | | | |
|---|---|---|---|
| 11,358,369 | B2 * | 6/2022 | Hwang ................. C23C 2/12 |
| 2005/0142294 | A1 | 6/2005 | Marutian et al. |
| 2008/0271823 | A1 | 11/2008 | Hofmann et al. |
| 2012/0085466 | A1 | 4/2012 | Lupp et al. |
| 2012/0090737 | A1 | 4/2012 | Fushiwaki et al. |
| 2013/0177780 | A1 | 7/2013 | Park et al. |
| 2013/0236739 | A1 | 9/2013 | Yoshida et al. |
| 2014/0030544 | A1 | 1/2014 | Maki et al. |
| 2015/0191813 | A1 | 7/2015 | Maki et al. |
| 2016/0047018 | A1 * | 2/2016 | Morimoto ................ C23C 2/02 |
| | | | 428/653 |
| 2016/0222484 | A1 | 8/2016 | Koyer et al. |
| 2017/0198374 | A1 | 7/2017 | Allely et al. |
| 2018/0237900 | A1 | 8/2018 | Kobayashi et al. |
| 2018/0363117 | A1 | 12/2018 | Sohn et al. |
| 2019/0160507 | A1 | 5/2019 | Sengoku et al. |
| 2019/0185970 | A1 | 6/2019 | Yoshida et al. |
| 2020/0156349 | A1 | 5/2020 | Morishita et al. |
| 2021/0008837 | A1 | 1/2021 | Hwang et al. |

FOREIGN PATENT DOCUMENTS

| | | |
|---|---|---|
| CN | 102378824 | 3/2012 |
| CN | 103228812 | 7/2013 |
| CN | 103282532 | 9/2013 |
| CN | 105074042 | 11/2015 |
| CN | 109689916 | 4/2019 |
| CN | 110959048 | 4/2020 |
| EP | 0080903 | 6/1983 |
| EP | 0097487 | 1/1984 |
| JP | S5727181 | 2/1982 |
| JP | H02015156 | 1/1990 |
| JP | H02085347 | 3/1990 |
| JP | H06299312 | 10/1994 |
| JP | H0913160 | 1/1997 |
| JP | H09316618 | 12/1997 |
| JP | H10158808 | 6/1998 |
| JP | H11350164 | 12/1999 |
| JP | 2003034845 | 2/2003 |
| JP | 2008169478 | 7/2008 |
| JP | 2010018860 | 1/2010 |
| JP | 2010070784 | 4/2010 |
| JP | 2010248602 | 11/2010 |
| JP | 2011214145 | 10/2011 |
| JP | 2012012649 | 1/2012 |
| JP | 2012126994 | 7/2012 |
| JP | 2013221202 | 10/2013 |
| JP | 2017524806 | 8/2017 |
| JP | 2021509437 | 3/2021 |
| KR | 20160015388 | 2/2016 |
| KR | 20160057418 | 5/2016 |
| KR | 20170138380 | 12/2017 |
| WO | 2017017513 | 2/2017 |
| WO | 2017195269 | 11/2017 |
| WO | 2019026106 | 2/2019 |

OTHER PUBLICATIONS

European Search Report—European Application No. 19853495.0 issued on Jun. 11, 2021, citing EP 0080903, WO 2017/195269, JP 2012-012649, and US 2015/0191813.

Japanese Office Action—Japanese Application No. 2021-510216 issued on May 10, 2022, citing JP 2010-070784, JP 2012-126994, JP H02-085347, JP H02-015156, JP 2017-524806, JP 2021-509437, US 2012/0085466, US 2005/0142294, WO 2017/017513, and KR 10-2016-0057418.

Chinese Office Action—Chinese Application No. 201980056672.5 issued on Aug. 29, 2022, citing JP 2012-012649, WO 2017/195269, KR 2016-0015388, JP 2010-018860, U.S. Pat. No. 4,456,663, JP H10-158808, JP 2011-214145, CN 102378824, US 2008/0271823, US 2016/0047018, CN 103282532, JP H09-13160, US 2018/0237900, EP 0097487, CN 1455824, WO 2019/026106, JP S57-27181, JP 2008-169478, CN 110959048, CN 103228812, CN 109689916, JP H06-299312, JP H11-350164, CN 105074042, CN 1392284, Dongxu, and Garcia et al.

Dongxu, Process and Mechanism of Hot Dipping Zn—Al—Mg Alloy by Reduction Method, Dissertation submitted to Hebei University of Technology for the Master Degree of Material Science, May 2019.

Garcia et al., The role of Si and Ti additions on the formation of the alloy layer at the interface of hot-dip Al—Zn coatings on steel strips, Materials Letters, 2006, vol. 60, pp. 775-778.

* cited by examiner (a)

(b)

(a)

(b)

(a)

(b)

ALUMINUM-ZINC ALLOY PLATED STEEL SHEET HAVING EXCELLENT HOT WORKABILITY AND CORROSION RESISTANCE, AND METHOD FOR MANUFACTURING SAME

TECHNICAL FIELD

The present disclosure relates to a manufacture for manufacturing an Al—Zn alloy plated steel sheet having high hot workability and corrosion resistance, and more particularly, to an Al—Zn alloy plated steel sheet, having high corrosion resistance and also a plating layer not sticking to a press die or roll during a hot forming process, and a method for manufacturing the Al—Zn alloy plated steel sheet.

BACKGROUND ART

In general, although Al-plated steel sheets or Zn-plated steel sheets have conventionally been used for hot forming, such steel sheets have a microcracking problem and a corrosion resistance deterioration problem is caused by an alloy phase formed during a heat treatment process.

Therefore, in order to address such corrosion resistance and hot workability deterioration problems, Patent Document 1 discloses an Al-plated steel sheet including, by wt %, Zn: 1% to 60%, Si: 1% to 15%, Mg: 0.5% to 10%, and Ca: 0.5% or less. However, this composition of a plating layer suppresses the formation of an Al—Fe alloy phase according to the addition of Mg, and thus microcracks may be formed in a base steel sheet during a hot forming process. In addition, since the addition of Mg suppresses the formation of an Al—Fe alloy phase at the interface between the plating layer and the base steel sheet, the plating layer may stick to a press die during a high-temperature machining process.

PRIOR-ART DOCUMENTS

Patent Document (Patent Document 1) Japanese patent application No: JP2001-190707 (filed on Jun. 25, 2001)
(Patent Document 2) Japanese Patent Application No: JP2009-102101 (filed on Apr. 20, 2009)

DISCLOSURE

Technical Problem

Therefore, an object of the present disclosure is to provide an Al—Zn alloy plated steel sheet capable of suppressing microcracking and hot sticking during a hot forming process and also having high corrosion resistance, and a method for manufacturing the Al—Zn alloy plated steel sheet.

In addition, the technical problems to be achieved in the present disclosure are not limited to the technical problems mentioned above, and other technical problems that are not mentioned may be clearly understood by those of ordinary skill in the art from the following description.

Technical Solution

To achieve the objectives of the present disclosure, there is provided an Al—Zn alloy plated steel sheet having high hot workability and corrosion resistance, the Al—Zn alloy plated steel sheet including an Al—Zn hot-dip aluminized plating layer on a base steel sheet,
wherein the plating layer includes a lower-layer portion and an upper-layer portion; the lower-layer portion includes, based on a weight thereof, Fe: 40% to 50%, Al: 50% to 60%, Si: 1% or less, and other inevitable impurities; the upper-layer portion includes, based on a weight thereof, Zn: 10% to 30%, and the balance of Al and 0.05% of less of one or more other impurities selected from the group consisting of Cr, Mo, and Ni; and the upper-layer portion has a thickness which is 30% or less of a total thickness of the plating layer.

In the present disclosure, the base steel sheet may be a cold-rolled steel sheet or a hot-rolled steel sheet.

The base steel sheet may include, by wt %, C: 0.05% to 0.3%, Si: 0.01% to 2.5%, Mn: 0.5% to 8%, Al: 0.01% to 0.5%, B: 100 ppm or less, and the balance of Fe and inevitable impurities.

In addition, the present disclosure provides a method for manufacturing an Al—Zn alloy plated steel sheet having high hot workability and corrosion resistance, the method including:

immersing and discharging a steel sheet in and from a plating bath which may include, by wt %, Zn: 10% to 30%, Si: 1% or less, and a balance of Al and inevitable impurities;

air wiping the steel sheet within a temperature range of 200° C. to 300° C. to adjust a thickness of a plating layer of the steel sheet discharged from the plating bath; and forming an alloy plating layer by alloying the thickness-adjusted plating layer of the steel sheet within a temperature range of 500° C. to 670° C.

The alloy plating layer may include a lower-layer portion and an upper-layer portion; the lower-layer portion may include, based on a weight thereof, Fe: 40% to 50%, Al: 50% to 60%, Si: 1% or less, and other inevitable impurities; the upper-layer portion may include, based on a weight thereof, Zn: 10% to 30%, and the balance of Al and 0.05% or less of one or more other impurities selected from the group consisting of Cr, Mo, and Ni; and the upper-layer portion may have a thickness which is 30% or less of a total thickness of the alloy plating layer.

Advantageous Effects

As described above, the present disclosure has an effect on manufacturing an Al—Zn alloy plated steel sheet having a plating layer which does not stick to a press die or roll during a hot forming process, suppresses microcracking, and improves corrosion resistance.

DESCRIPTION OF DRAWINGS

FIG. 1(b) is a schematic cross-sectional view illustrating an Al—Zn alloy plated steel sheet manufactured by a method of the present disclosure.

BEST MODE

Figure 1:
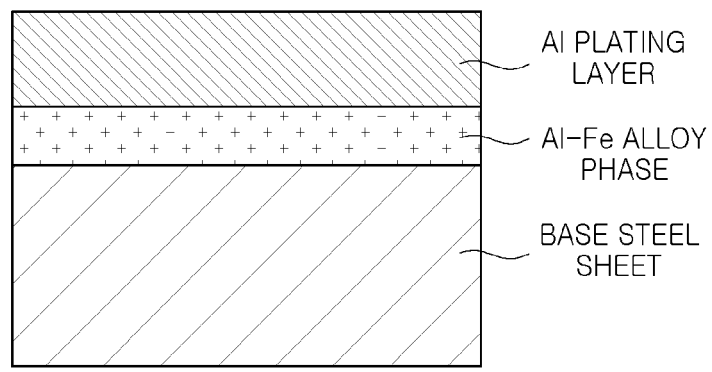
FIGS. 1(a) and 1(b) are schematic cross-sectional views illustrating Al—Zn alloy plated steel sheets, FIG. 1(a) being a schematic cross-sectional view illustrating an Al—Zn alloy plated steel sheet of the related art.
Figure 1:
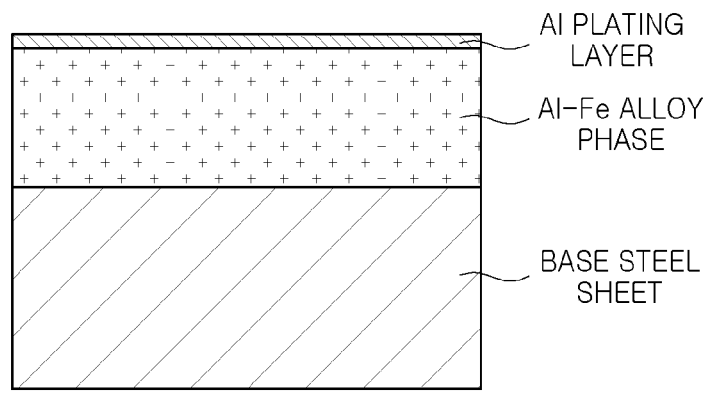

Hereinafter, the present disclosure will be described.

The inventors have found that when the thickness of an upper-layer portion of a plating layer, which includes Al as a main component, is 30% or more of the total thickness of the plating layer in an Al alloy plated steel sheet, the plating layer sticks to a press die during a high-temperature machining process. In addition, as a result of repeated research and experimentation performed to solve this problem, the inventors have found that this problem can be solved by optimally controlling the composition of a hot-dip plating bath and the conditions of air wiping and cooling, and based on this, the inventors have provided the present disclosure.

An Al—Zn alloy plated steel sheet of the present disclosure is a plated steel sheet having an Al—Zn hot-dip aluminized plating layer on a base steel sheet, and the plating layer includes a lower-layer portion and an upper-layer portion, wherein the lower-layer portion includes, based on the weight thereof, Fe: 40% to 50%, Al: 50% to 60%, Si: 1% or less, and other inevitable impurities, and the upper-layer portion includes, based on the weight thereof, Zn: 10% to 30%, and the balance of Al and 0.05% or less of one or more other impurities selected from the group consisting of Cr, Mo, and Ni, wherein the thickness of the upper-layer portion is less than 30% of the total thickness of the plating layer.

In the present disclosure, the base steel sheet may be a general cold-rolled steel sheet or a general hot-rolled steel.

In addition, preferably, the base steel sheet may include, by wt %, C: 0.05% to 0.3%, Si: 0.01% to 2.5%, Mn: 0.5% to 8%, Al: 0.01% to 0.5%, B: 100 ppm or less, and the balance of Fe and inevitable impurities.

In addition, the Al—Zn alloy plating layer of the present disclosure includes: the lower-layer portion formed directly on the base steel sheet; and the upper-layer portion formed on the lower-layer portion.

The lower-layer portion may be formed of an intermetallic Al—Fe compound: an Fe2Al5 phase or an FeAl3 phase. In this case, preferably, the lower-layer portion includes, based on the weight thereof, Fe: 40% to 50%, Al: 50% to 60%, Si: 1%, and a balance of Al and inevitable impurities.

Preferably, the upper-layer portion includes, based on the weight thereof, Zn: 10% to 30%, and a balance of Al and 0.05% or less of one or more other impurities selected from the group consisting of Cr, Mo, and Ni.

Furthermore, in the present disclosure, the thickness of the upper-layer portion is adjusted to be 30% or less of the total thickness of the plating layer.

In general, Si contained in an Al alloy plating bath suppresses the formation of an intermetallic Al—Fe compound layer, and thus the thickness of an Al—Fe alloy phase is about 20% to 40% of the total thickness of a plating layer.

However, according to the results of research conducted by the inventors showed that when the ratio of the thickness of the lower-layer portion to the total thickness of the plating layer exceeds 70%, the Al—Zn alloy plated steel sheet can be manufactured such that the plating layer does not stick to a press die or roll during a hot forming process, microcracking is suppressed, and corrosion resistance is improved. However, even if the Si content in the above-described plating bath is reduced, it is difficult to adjust the thickness of the Al—Fe alloy phase to be greater than 70% of the total thickness of the plating layer, and thus this adjustment may be realized by controlling air-wiping and cooling conditions etc as described later.

Next, a method for manufacturing an Al—Zn alloy plated steel sheet will be described according to the present disclosure.

The method for manufacturing an Al—Zn alloy plated steel sheet of the present disclosure includes: immersing and discharging a steel sheet in and from a plating bath containing, by wt %, Zn: 10% to 30%, Si: 1% or less, and a balance of Al and inevitable impurities; Air wiping the steel sheet within the temperature range of 200° C. to 300° C. so as to adjust the thickness of a plating layer of the steel sheet discharged from the plating bath; and forming an alloy plating layer by alloying the thickness-adjusted plating layer of the steel sheet within the temperature range of 500° C. to 670° C.

According to the present disclosure, first, a base steel sheet to be plated may be immersed in the plating bath containing, by wt %, Zn: 10% to 30%, Si: 1% or less, a balance of Al and inevitable impurities, and may continuously be discharged from the plating bath, thereby coating the base steel sheet with a plating layer.

According to the present disclosure, it is preferable that the plating bath contain, by wt %, Zn: 10% to 30%, Si: 1% or less, and the balance of Al. If the content of Zn is less than 10 wt %, corrosion resistance may deteriorate to result in low surface corrosion resistance and low sacrificial corrosion resistance, and if the content of Zn exceeds 30%, interface alloy formability may be low. Furthermore, in the present disclosure, it is required to adjust the content of Si content in the plating bath to be 1.0 wt % or less because a high Si content decreases the thickness of a lower plating layer (lower layer), thus makes it difficult to adjust the thickness of an upper plating layer (upper layer) to be 30% or less of the total plating thickness, and accordingly makes it difficult to obtain plating layer characteristics intended in the present disclosure.

Thereafter, according to the present disclosure, air wiping is performed within the temperature range of 200° C. to 300° in order to adjust the thickness of the plating layer of the steel sheet discharged from the plating bath.

In detail, according to the present disclosure, the thickness of the plating layer is adjusted to be an appropriate value using air pressure by passing the plated steel sheet discharged from the plating bath through a well-known air knife.

At this time, according to the present disclosure, the temperature of air wiping may preferably be adjusted to the range of 200° C. to 300° C. in order to ensure continuous Al—Fe alloy phase formation, and since the solidification of the plating layer is maximally suppressed within the temperature range, the Al—Fe alloy phase formation may be facilitated. Specifically, if the air wiping temperature is less than 200° C., there is a problem of suppressing the formation of the Al—Fe alloy phase, and if the air wiping temperature exceeds 300° C., the effect of increasing the temperature may be saturated.

In addition, according to the present disclosure, the thickness-adjusted plating layer of the steel sheet may be alloyed within the temperature range of 500° C. to 670° C. to finally manufacture a plated steel sheet having an alloy plating layer.

That is, in the present disclosure, in order to form an additional Al—Fe alloy phase, heat treatment is additionally performed within the temperature range of 500° C. to 670° C. to adjust the thickness of the Al—Fe alloy phase to be greater than 70% of the total thickness of the plating layer. If the heat treatment temperature is less than 500° C., the layer thickness of the Al—Fe alloy phase may not be greater than 70% of the total plating thickness, and if the heat treatment temperature exceeds 670° C., the Fe—Al alloy phase may be excessively formed to result in poor plating adhesion.

More preferably, the temperature range may be from 630° C. to 670° C.

In addition, FIGS. 1(a) and 1(b) are schematic cross-sectional views illustrating Al—Zn alloy plated steel sheets, FIG. 1(a) being a schematic cross-sectional view illustrating a conventional Al—Zn alloy plated steel sheet, and FIG. 1(b) being a schematic cross-sectional view illustrating an Al—Zn alloy plated steel sheet manufactured by the manufacturing method of the present disclosure. As shown in FIGS. 1(a) and 1(b), the Al—Fe alloy phase (lower layer) of the plated steel sheet manufactured by the manufacturing method of the present disclosure is much thicker than that of the conventional plated steel sheet.

MODE FOR INVENTION

Hereinafter, the present disclosure will be described in detail through examples.

EXAMPLES

A cold-rolled steel sheet for hot forming was prepared, the cold-rolled steel sheet including, by wt %, C: 0.22%, Mn: 1.6%, Si: 0.3%, B: 30 ppm, and the balance of Fe and inevitable impurities. Then, the cold-rolled steel sheet was continuously immersed in a hot-dip aluminum plating bath containing, by wt %, Zn: 10% to 30%, Si: 0% to 9%, and a balance of Al and inevitable impurities so as to form a plating layer on the surface of the steel sheet. In that time, the temperature of the plating bath was adjusted to be 580° C.

Then, the plated steel sheet discharged to the outside was passed through an air knife to adjust the thickness of the plating layer. At that time, an experiment was performed while varying the temperature of air wiping within the range of 200° C. to 350° C. as shown in Table 1 below, so as to vary the thickness of a Fe—Al alloy phase being a lower plating layer. Thereafter, alloying treatment was performed while varying the alloying temperature within the range of 530° C. to 700° C. as shown in Table 1 below, so as to promote the formation of an Al—Fe-rich alloy phase in the thickness-adjusted plating layer of the plated steel sheet.

The compositions of a lower-layer portion and an upper-layer portion of each Al—Zn alloy plating layer formed as described above were analyzed as shown in Table 1 below. In addition, the ratio of the thickness of the upper-layer portion to the thickness of the Al—Zn alloy plating layer was measured as shown in Table 1 below.

In addition, the sticking resistance, LME, corrosion resistance, and plating adhesion of each of the Al—Zn alloy plating layer prepared as described above were evaluated as shown in Table 1 below. In addition, the sticking resistance, LME, corrosion resistance, and plating adhesion were evaluated according to the following criterion.

[Sticking Resistance]

The number of sites of a press on which a plating layer is stuck after heat treatment (900° C., 5 minutes) and then machining with the press.

○: Excellent (5 or fewer in a 100×100 mm area)
Δ: Inferior (5 to 30 in a 100×100 mm area)
x: Poor (30 or more in a 100×100 mm area)

[LME Measurement]

A crack length measured after spot welding (pressing force: 4.0 kN, electrode diameter 6 mm, 0.5 kA) by observing a cross-section image by a scanning electron microscope (SEM).

○: Excellent (LME crack: 150 µm or less)
Δ: Inferior (LME crack: 151 µm to 500 µm)
x: Poor (LME crack: 501 µm or more)

[Corrosion Resistance]

The maximum depth of pits formed in a base steel sheet when corrosion products were removed in 1200 hours after heat treatment (900° C., 5 minutes) and a salt spray test (SST).

○: Excellent (pits depth: 300 µm or less)
Δ: Inferior (pits depth: 301 µm to 600 µm)
x: Poor (pits depth: 601 µm or more)

[Plating Adhesion]

The portion of a plating layer separated by a sealer after a 90° bending test using the sealer.

○: Excellent (no plating separation)
Δ: Inferior (plating separation: 10% or less)
x: Poor (plating separation: 10% or more)

TABLE 1

| IE/CE | A/W Temp. (° C.) | Alloying Temp. (° C.) | Composition of lower plating layer (wt %) | | | | Composition of upper plating layer (wt %) | | | Proportion of upper plating thickness (%) | Sticking resistance | LME | Corrosion resistance | Plating adhesion |
|---|---|---|---|---|---|---|---|---|---|---|---|---|---|---|
| | | | Al | Zn | Si | Fe | Al | Zn | Si | | | | | |
| IE1 | 200 | 550 | 59.5 | 0.5 | 0 | 40 | 90.0 | 10 | 0 | 30 | ○ | ○ | ○ | ○ |
| IE2 | 200 | 580 | 54.3 | 1.2 | 0.5 | 44 | 79.5 | 20 | 0.5 | 20 | ○ | ○ | ○ | ○ |
| IE3 | 250 | 550 | 52.2 | 1.5 | 0.3 | 46 | 74.9 | 25 | 0.1 | 10 | ○ | ○ | ○ | ○ |
| IE4 | 250 | 650 | 49.8 | 2 | 0.2 | 48 | 69.9 | 30 | 0.1 | 5 | ○ | ○ | ○ | ○ |
| IE5 | 300 | 550 | 51.0 | 1.7 | 0.3 | 47 | 84.9 | 15 | 0.1 | 22 | ○ | ○ | ○ | ○ |
| IE6 | 300 | 650 | 48.1 | 1.9 | 1.0 | 49 | 79.8 | 20 | 0.2 | 5 | ○ | ○ | ○ | ○ |
| IE7 | 350 | 650 | 47.8 | 2 | 0.2 | 50 | 69.8 | 30 | 0.2 | 0 | ○ | ○ | ○ | ○ |
| CE1 | 200 | 530 | 60.6 | 1.4 | 3.0 | 35 | 87.5 | 10 | 2.5 | 40 | X | ○ | ○ | ○ |
| CE2 | 200 | 700 | 48.9 | 1.1 | 5.0 | 45 | 86.0 | 10 | 4.0 | 35 | X | ○ | ○ | X |
| CE3 | 150 | 550 | 58.7 | 1.3 | 7.0 | 33 | 64.0 | 30 | 6.0 | 50 | X | ○ | ○ | ○ |
| CE4 | 150 | 680 | 45.8 | 1.2 | 9.0 | 44 | 63.0 | 30 | 7.0 | 45 | ○ | ○ | ○ | X |

(IE: Inventive example, CE: Comparative Example)
*A/W in Table 1 refers to air wiping As shown in Table 1 above, in the case of Inventive Examples 1-7 in which the content of Si in each plating layer is appropriate and the air-wiping and alloying temperatures are within the ranges of the present disclosure, the thickness of each upper plating layer is 30% or less of the total plating layer thickness, and thus the sticking resistance, LME, corrosion resistance, and plating adhesion of the plating layer are satisfactory.

On the contrary, in the case of Comparative Example 1-4 in which the content of Si is excessive in each plating layer or the air-wiping and alloying temperatures are outside the ranges of the present disclosure, sticking resistance and plating adhesion are particularly poor compared to the inventive examples.

Therefore, it can be confirmed, from the examples, that the control of Si in the hot-dip plating bath and the temperature ranges of air wiping and alloying are technically key factors when the thickness of an upper plating layer is adjusted to be 30% or less of the total plating thickness.

Figure 2:
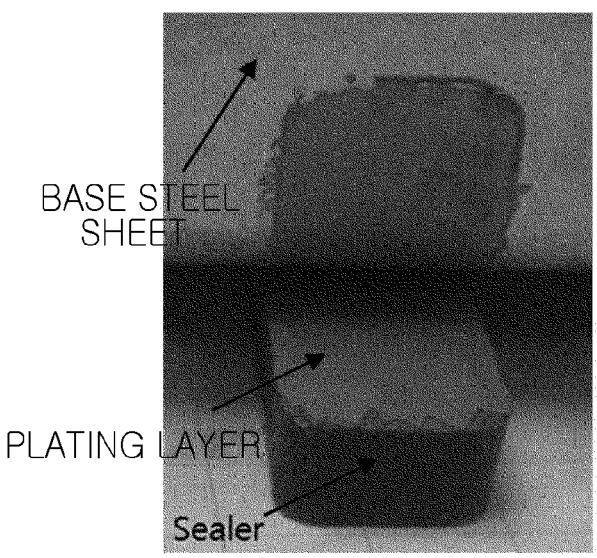
FIGS. 2(a) and 2(b) are images illustrating the degree of adhesion of alloy plating layers formed according to examples of the present disclosure, FIG. 2(a) illustrating Comparative Example 1, and FIG. 2(b) illustrating Inventive Example 1.
Figure 2:
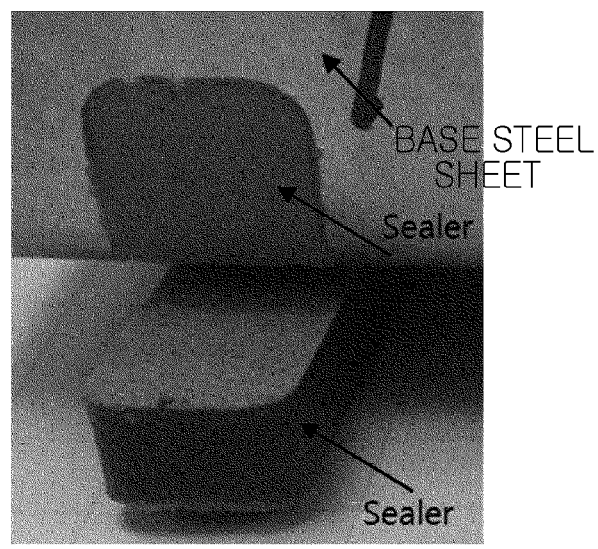

In addition, FIGS. 2(a) and 2(b) are images illustrating the degree of adhesion of alloy plating layers formed according to examples of the present disclosure, FIG. 2(a) illustrating Comparative Example 1, and FIG. 2(b) illustrating Inventive Example 1.

Figure 3:
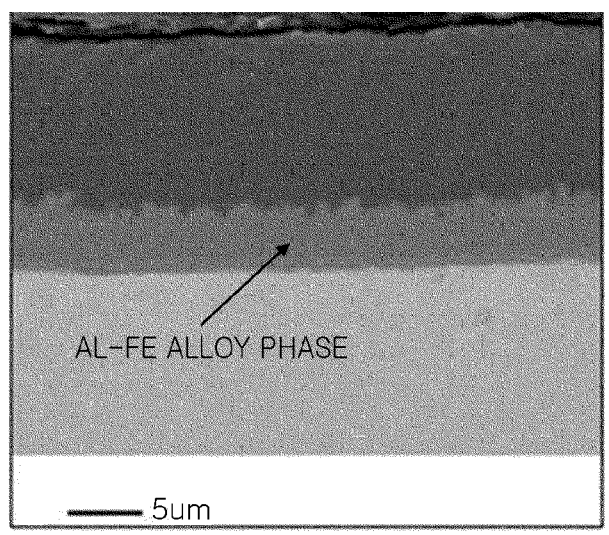
FIGS. 3(a) and 3(b) are SEM images illustrating cross-sections of plating layers formed according to examples of the present disclosure, FIG. 3(a) illustrating Comparative Example 1, and FIG. 3(b) illustrating Inventive Example 1.
Figure 3:
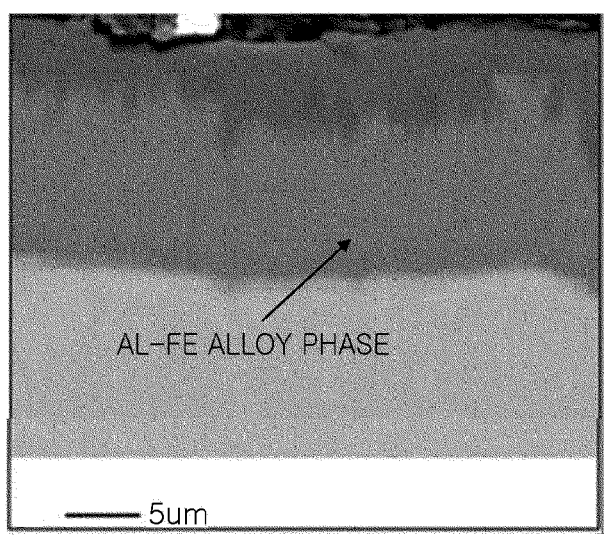

In addition, FIGS. 3(a) and 3(b) are SEM images illustrating cross-sections of plating layers formed according to examples of the present disclosure, FIG. 3(a) illustrating Comparative Example 1, and FIG. 3(b) illustrating Inventive Example 1. As shown in FIGS. 3(a) and 3(b), the thickness of an Al—Fe phase (lower plating layer) is greater in Inventive Example 1 than in Comparative Example 1. In other words, the thickness of the upper plating layer can be adjusted to be 30% or less of the total plating thickness in Inventive Example 1 unlike in Comparative Example 1.

As described above, although the present disclosure has been described according to specific embodiments and examples, the present disclosure is not limited thereto, and those of ordinary skill in the art will understand that various modifications and changes can be made within the technical idea of the present disclosure and the scope of the present disclosure defined by the following claims and equivalents thereof.

The invention claimed is:

1. An Al—Zn alloy plated steel sheet having workability and corrosion resistance, the Al—Zn alloy plated steel sheet comprising an Al—Zn hot-dip aluminized plating layer on a base steel sheet,
wherein the plating layer comprises:
a lower-layer portion comprising, based on a weight thereof:
Fe: 40% to 50%,
Al: 50% to 60%,
Si: 1% or less, and
inevitable impurities; and
an upper-layer portion comprising, based on a weight thereof:
Zn: 10% to 30%,
Al: 69.8 to 90%, and
the balance of 0.05% or less of one or more impurities selected from the group consisting of Cr, Mo, and Ni;
wherein an amount of Si, if present, in the lower-layer portion is the same as or greater than an amount of Si, if present, in the upper-layer portion; and
wherein the upper-layer portion has a thickness which is 30% or less of a total thickness of the plating layer.

2. The Al—Zn alloy plated steel sheet of claim 1, wherein the base steel sheet is a cold-rolled steel sheet or a hot-rolled steel sheet.

3. The Al—Zn alloy plated steel sheet of claim 1, wherein the base steel sheet comprises, by wt %, C: 0.05% to 0.3%, Si: 0.01% to 2.5%, Mn: 0.5% to 8%, Al: 0.01% to 0.5%, B: 100 ppm or less, and the balance of Fe and inevitable impurities.

4. The Al—Zn alloy plated steel sheet of claim 1, wherein the lower-layer portion and the upper-layer portion are free of Si.

5. The Al—Zn alloy plated steel sheet of claim 1, wherein the amount of Si in the lower-layer portion is the same as the amount of Si in the upper-layer portion.

6. The Al—Zn alloy plated steel sheet of claim 1, wherein the amount of Si in the lower-layer portion is greater than the amount of Si in the upper-layer portion.

* * * * *